United States Patent
Doege et al.

(10) Patent No.: US 6,275,881 B1
(45) Date of Patent: Aug. 14, 2001

(54) DEVICE FOR INHERENTLY SAFE SIGNAL MATCHING

(75) Inventors: Ralf Doege, Essen; Udo Becker, Muehlheim; Rolf Horstmann, Moers, all of (DE)

(73) Assignee: CEAG Sicherheitstechnik, Soest (DE)

( * ) Notice: Subject to any disclaimer, the term of this patent is extended or adjusted under 35 U.S.C. 154(b) by 0 days.

(21) Appl. No.: 09/240,581

(22) Filed: Feb. 1, 1999

Related U.S. Application Data

(63) Continuation of application No. 08/930,270, filed as application No. PCT/EP96/01372 on Mar. 28, 1996.

(30) Foreign Application Priority Data

Apr. 1, 1995 (DE) ............................................... 195 12 372

(51) Int. Cl.[7] .................................................. G06F 13/00
(52) U.S. Cl. .............................. 710/102; 710/129; 710/8; 709/253
(58) Field of Search ................................. 710/1, 100, 102, 710/129, 8, 62; 709/100, 250, 253; 361/624, 637, 728, 823; 340/825.07, 870.01; 370/438; 439/716; 375/257; 713/300

(56) References Cited

U.S. PATENT DOCUMENTS

| | | | |
|---|---|---|---|
| 5,068,778 | | 11/1991 | Kosem et al. ....................... 364/138 |
| 5,224,974 | * | 7/1993 | Mathews et al. . |
| 5,512,890 | * | 4/1996 | Everson, Jr. et al. . |
| 5,522,043 | * | 5/1996 | Fukunaga . |
| 5,555,421 | * | 9/1996 | Enzinna . |
| 5,629,831 | * | 5/1997 | Eggert et al. . |
| 5,835,534 | * | 11/1998 | Kogure . |
| 5,978,593 | * | 11/1999 | Sexton . |
| 6,075,452 | * | 6/2000 | Tsuchihashi . |

FOREIGN PATENT DOCUMENTS

| | | |
|---|---|---|
| 41 35 749 A1 | 5/1992 | (DE) . |
| 0 556 991 A | 8/1993 | (EP) . |
| 0 618 518 A1 | 1/1994 | (EP) . |
| 92/04813 | 3/1992 | (WO) . |

OTHER PUBLICATIONS

Schneider, Hans–Josef, "Sensor Systems for Measuring and Communication Technology in Production Plants", Automatisierungstechnische Praxis—ATP, vol. 33, No. 10, Oct. 1991, pp. 511–516, Munchen, Germany.

Karsten, Andreas, "Individualisten", Elektrotechnik, vol. 76, No. 4, Apr. 1994, pp. 40–42, Wurzburg, Germany.

* cited by examiner

Primary Examiner—Gopal C. Ray
(74) Attorney, Agent, or Firm—Fish & Richardson P.C.

(57) ABSTRACT

The invention relates to a device for an inherently safe signal matching of signals being exchanged between an automating system (2) and field devices (3). The device (1) contains input/output modules (4), which can be plugged into a backwall plate (19) and which combine the functions of conventional input/output modules and modules for voltage separation. The backwall plate (19) supports data lines (20) of a local bus (8), as well a current supply lines (21). A communications module (9) is connected on the one hand with the local bus (8), and on the other hand with a field bus (12). The communications module (9) contains device, for memorizing (22) and processing (16) data, and makes possible an asynchronous data exchange between an automating system (2) and the input/output modules (4).

20 Claims, 3 Drawing Sheets

DEVICE FOR INHERENTLY SAFE SIGNAL MATCHING

CROSS-REFERENCE TO RELATED APPLICATIONS

This application is a continuation and claims the benefit of application Ser. No. 08/930,270, filed Sep. 29, 1997, under 35 U.S.C. §120 which is a 371 of PCT/EP96/01372 filed Mar. 28, 1996.

BACKGROUND OF THE INVENTION

The invention relates to a device for an inherently safe matching of signals and more specifically to a device that allows the safe and efficient exchange of input/output modules within an automating system.

Such a device is known from WO 92/04813. Such a device for an inherently safe signal matching is intended to provide a safe separation, in the sense of an explosion protection, of the signal flow between an automating system and so-called field devices, i.e. sensors and actuators, in connection with an explosion-endangered process.

With the known device, a number of input/output modules can be plugged into a backwall plate with an assembly rail. These input/output modules are connected by means of a communications unit, also plugged into the assembly rail, with a computer of the automating system, wherein the setting of parameters and the initialization of the device takes place directly by the automating system.

This applies in the same way for performing a diagnosis, which is also performed directly by the automating system.

SUMMARY OF THE INVENTION

This invention is, therefore, based on the object of improving a device for the inherently safe signal matching of the type mentioned at the outset to the effect, that a modular construction of the device with automatic configuration is possible.

The device in accordance with the invention operates with input/output modules, which are connected via a communications module with devices for data processing and data storage with the automating system via a field bus. By means of this, and by means of at least one further standard interface connected with the communications module, it is possible to store and recall parameters for the initialization and automatic configuration of the device in accordance with the invention in the communications module, safely in case of a current supply net failure. Furthermore, the setting of parameters performed by the communications module, in particular with the modular construction of the backwall plate, furthermore is used for an easier adaptation of the device in accordance with the invention, for example in case of the removal of this device.

In the article "Sensorsysteme für die Betriebsmeßtechnik und Kommunikation im Feld" [Sensor Systems for Industrial Measuring Technology and Communications in the Field] in ATM, Automatisierungstechnische Praxis+Messen, Steuern, Regeln 34 [Practical Technical Automation+ Measuring, Controlling, Regulating] (1991, pages 511 to 516) various sensor systems are known, of which one system can be connected, for example by means of a further interface card, with the field apparatus from other manufacturers in order to operate it. Furthermore, this system has a bus, by means of which further field devices can be connected via measuring transformers without the interposition of a communications module in the conventional manner.

BRIEF DESCRIPTION OF THE INVENTION

Further advantages as well as design possibilities ensue from the further claims and the following description of an exemplary embodiment by means of the drawing figures where:

DETAILED DESCRIPTION OF THE INVENTION

First, what FIGS. 1 to 5 represent in detail will be explained below. A description of the function or respectively the mode of operation will follows this.

Figure 1:
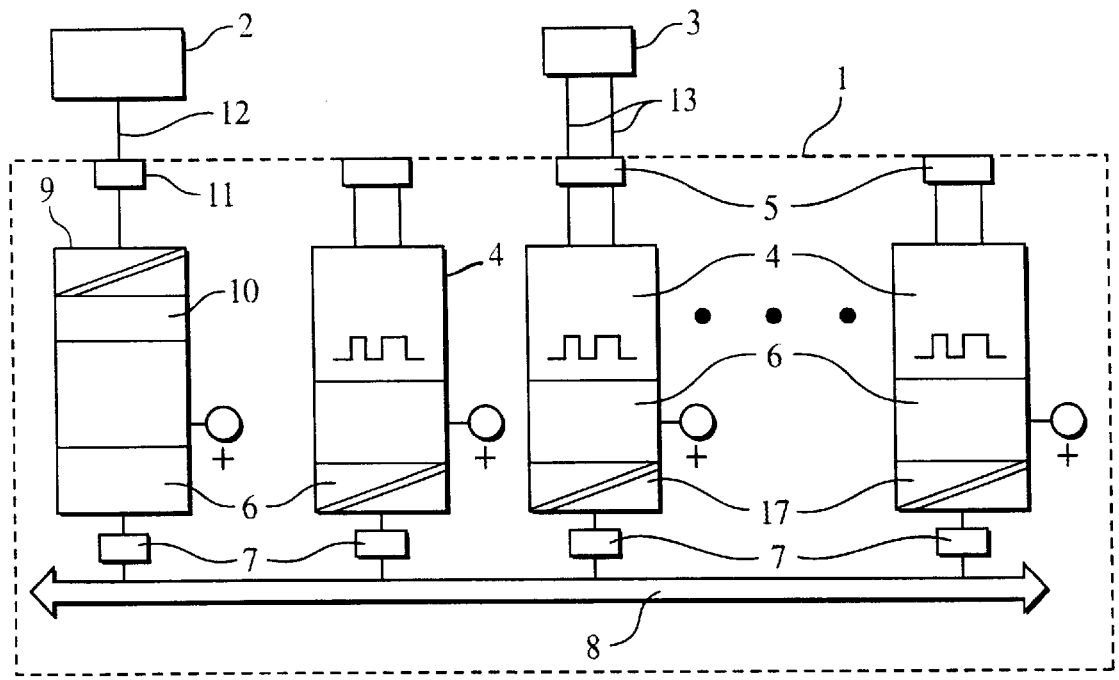
FIG. 1 is a block diagram of the total arrangement for signal adaptation.

FIG. 1 shows a device 1 for the inherently safe matching of the signals to be exchanged between an automating system 2 and field device 3, wherein primarily the paths of the signal flow are represented. The device 1 contains a plurality of input/output modules 4 with I/O connectors 5 for the field devices 3. The input/output modules 4 contain a local bus interface 6 and are connected via a contacting device 7 with lines 20 (FIG. 2) of a local bus 8.

The device 1, furthermore, contains a communications module 9, which also has a local bus interface 6 and a contacting device 7 for connection with the local bus 8. The communications module 9 has a field bus interface 10 and a field bus connector 11. The device 1 is connected via the field bus connector 11 with an automating system 2 via a field bus 12. The field devices 3 are respectively connected via lines 13 with the I/O connectors 5. In a possible structural embodiment explained further down below by means of FIG. 5, the field bus connector 11 is located on an initial plate 19.1 instead of on the module 9.

The automating system 2 can be, for example, a memory-programmable control. Digital or analog sensors or actuators can be connected as the field devices 3. The contacting device 7 can be a plug connection or an arrangement of pressure contact pins, for example. The local bus 8 is preferably embodied as a simple, serial and cost-effective bus. Control of the local bus 8 can take place from the communications module 9.

Figure 2:
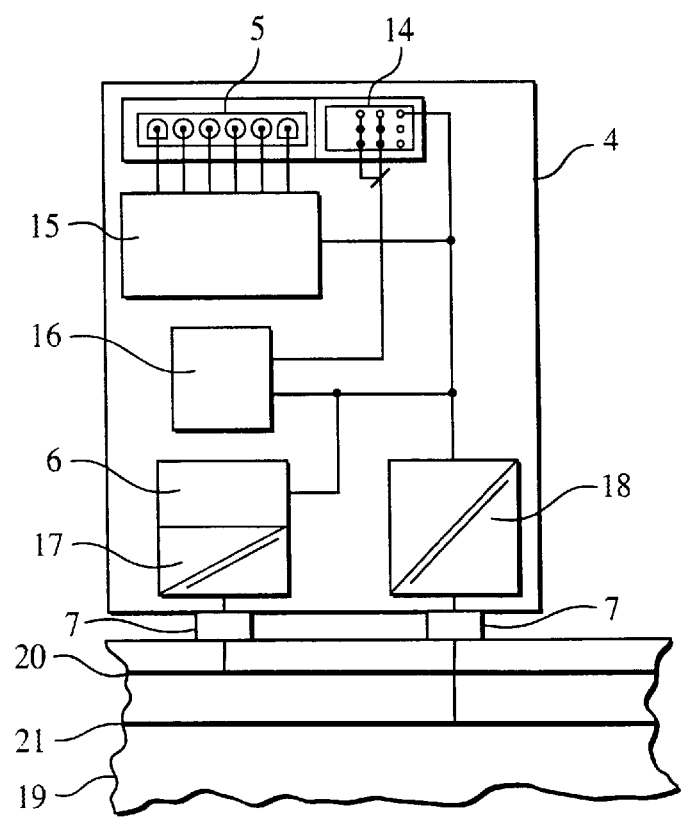
FIG. 2 is a block diagram of an input/output module.

FIG. 2 shows further details of the structure of an input/output module 4. In the exemplary embodiment, the input/output modules 4 contain a microprocessor 16 for signal processing, and a module 15 for signal matching. The connection of the local bus interface 6 with data lines 20 of the local bus 8 takes place via a safe galvanic signal separation device 17 (ex-i) and the contacting device 7. The safe galvanic separation can also be provided in the signal matching device. The data lines 20 are located in the form of strip conductors on a backwall plate 19, which, in addition, supports current supply strip conductors 21. The current supply strip conductors 21 carry a pre-stabilized supply voltage (for example±1% tolerance threshold). A safe galvanic separation is performed in a current supply module 18 and, depending on the type of the supply voltage, also a transformation and, if required, further stabilization. Besides the I/O connectors 5, a display field 14 for signaling the interior states (auxiliary energy, errors, switching state, . . . ) is located on the front of the module.

Figure 3:
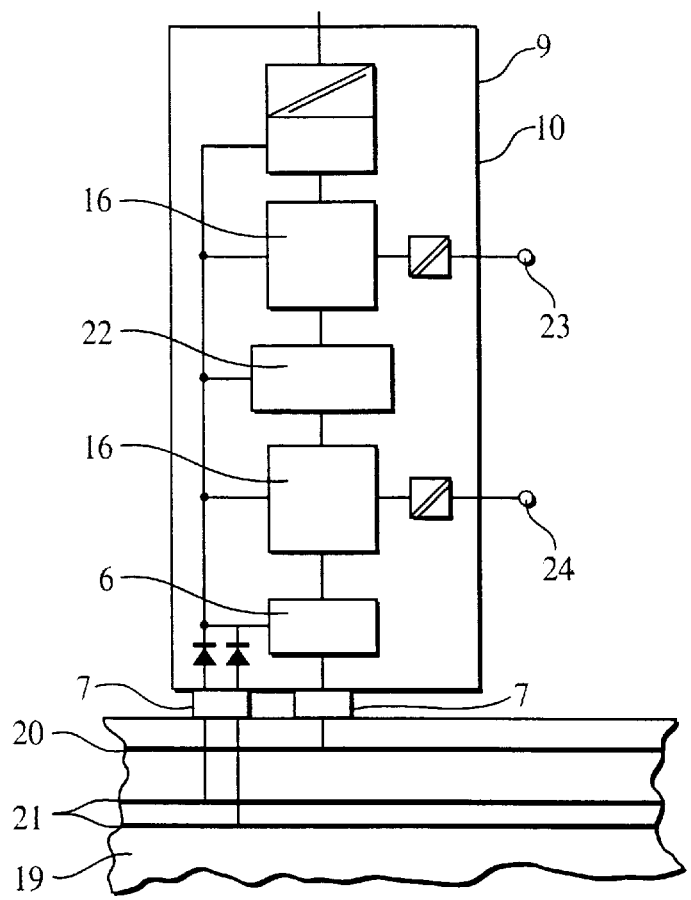
FIG. 3 is a block diagram of a communications module.

FIG. 3 shows further details of the communications module 9. Besides two microprocessors 16, the module 9 contains a memory 22. Besides the local bus interface 6 and the field bus interface 10, standard interfaces 23, 24 are also provided (for example, RS 485), which are used for setting parameters (for example by means of a PC or a local display and operating unit with manufacturer-specific and HART protocol). All parameters can be stored in the communications module 9 safe against failure of the current supply net, and are transmitted to the I/O modules 4 in the initialization phase. It can be furthermore seen from FIG. 3, that a redundant auxiliary energy input from redundant current supply strip conductors 21 can be provided, for example, if more than eight input/output modules 4 are used.

Figure 4:
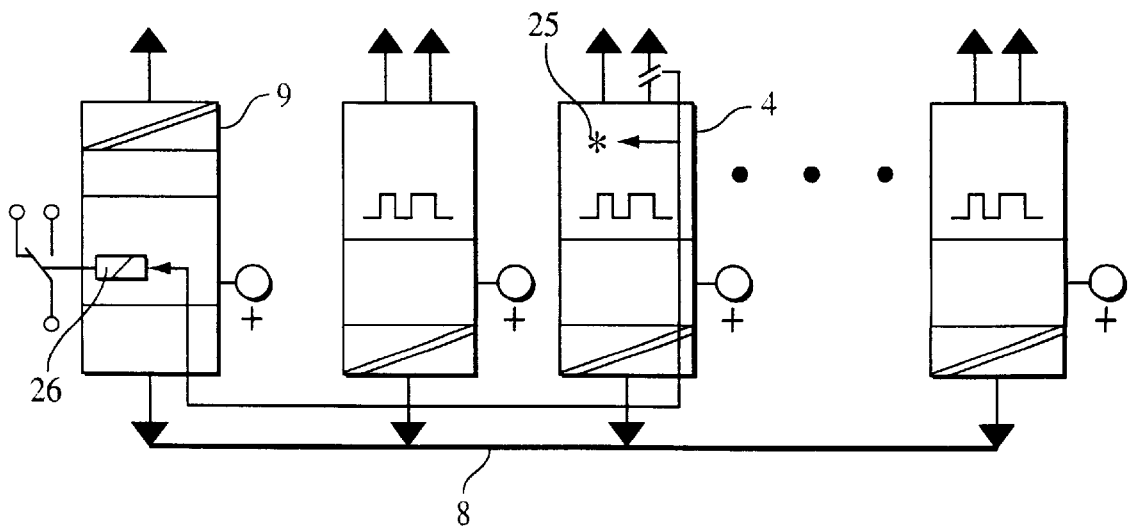
FIG. 4 is a block diagram of line break and short circuit monitoring devices.

In FIG. 4 it is shown that there can be additionally devices for line break and short circuit monitoring. Individual parameters can be set for each input/output module 4. Error conditions can be displayed at the input/output module 4 with the aid of a light-emitting diode 25 (a part of the display field 14). An error detected by an input/output module 4 is transmitted via the local bus 8 to the communications module 9. Such error reports are stored in the memory 22 of the communications module 9. In addition, the communications module 9 can contain devices 26, for example a relay with relay contacts for a collective reporting of errors. A transmission of errors can take place simultaneously with the signal transmission via the local bus 9 as well as via the field bus 12.

Figure 5:
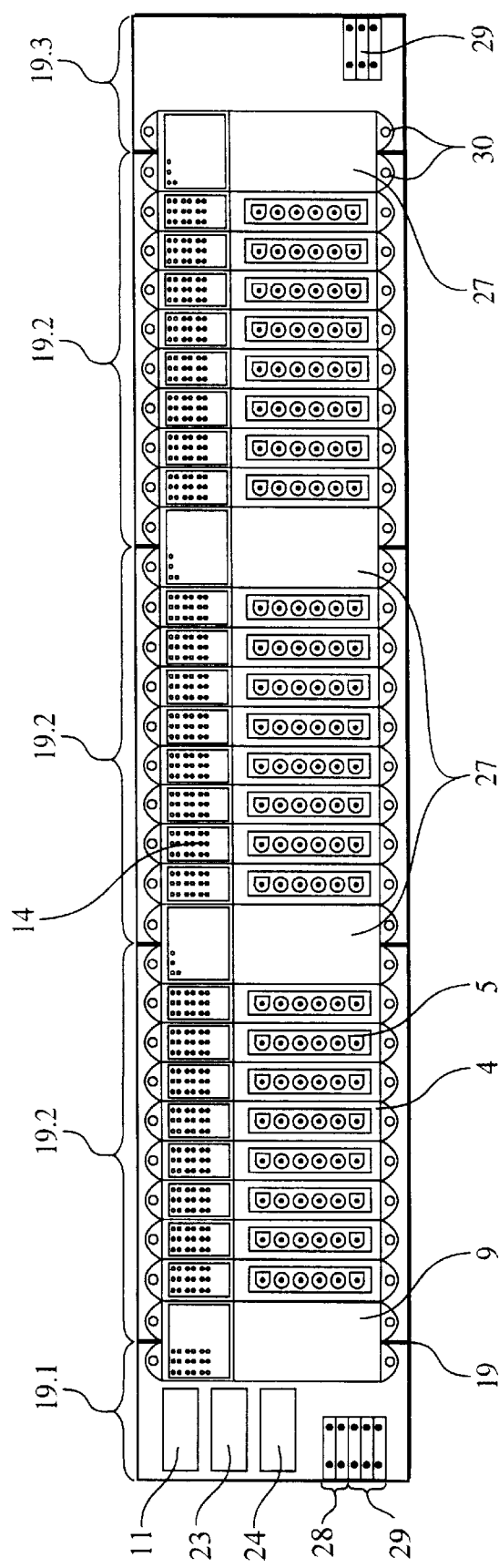
FIG. 5 is a block diagram of a backwall plate.

FIG. 5 shows a preferred structural embodiment of the device 1. In the exemplary embodiment represented, a modular back plane technology is used, wherein the backwall plate 19 is composed of an initial plate 19.1 and several mother plates 19.2, which can be cascaded, and an end plate 19.3. One mother plate 19.2 is provided for receiving, for example, eight input/output modules 4. The electrical connections between the individual plates 19.1, 19.2 and 19.3 are made via plugs.

The mechanical connection between the mother plates 19.2 or respectively between a mother plate 19.2 and the end plate 19.3 is provided with the aid of connecting modules 27 which are twice as wide as an input/output module. The connecting modules each contain devices for pre-stabilizing the supply voltage for a mother plate 19.2. The initial plate 19.1 is mechanically connected with a mother plate 19.2 with the aid of the communications module 9. The communications module 9 is just as wide as the connecting modules 27. The initial plate 19.1 has the field bus connector 11, as well as connectors 23 or respectively 24 with the standard interfaces. Further connections on the initial plate 19.1 are contact connectors 28 of the collective reporting device 26 as well as connections for an auxiliary energy source, not represented in the drawings. The I/O connectors 5 of the input modules 4 are respectively located on the front of the input modules 4.

The device 1, represented in FIGS. 1 to 5, makes possible the conversion of analog signals of the field devices 3 in the input modules 4 into digital values. Data transmitted via the local bus 8 to the communications module 9, the same as configuration and status information, are intermediately stored there in accordance with a memory map method. Thus the communication module 9 permits an asynchronous connection with the automating system.

The system is self-configuring, so that neither address switches nor external aids or respectively software are required in order to fix the function or position of individual modules. Input/output modules 4 are allowed to be exchanged while charged with voltage, while the remaining modules continue to work free of interference. All parameters, for example for temperature ranges, threshold values and error recognition are stored, safe against loss of the current supply net, in the communications modules and can be called up by means of the standard interface 24 for a PC connection. Setting of parameters can take place from the automating system 2 as well as via the standard interface 24.

HART protocols transmitted from the field bus 12 are passed on transparent to an input/output module.

The individual plates of the backwall plate 19 can be inserted into plastic profiles, which can be snapped on a DIN cap- profiled rail for assembly. Overlapping grounding rails are located in the plastic profiles, which are meshed with each other and electrically connected by pushing the profile supports together. The electrical connection of the plates is provided via plugs located on the underside of the plates. The bolting together of the double-width connecting modules 27 with the grounding ails of two neighboring mother plates 19.2 past the plate boundaries secures the mechanical connection. Plugged in modules 4, 9, 27 are screwed together by means of crews 30, by means of which an electrical and mechanical connection between the module and the grounding rail (not represented) is made as an EMV—conforming grounding.

What is claimed is:

1. A device for the inherently safe signal matching of signals being exchanged between a system and field devices comprising:

a backwall plate, dividable into individual plates, which supports data lines of a local bus and current supply lines;

input/output modules having a local bus interface, a data processing device and a signal matching device, which can be attached to said backwall plate via connections; and a communications module, attached to said backwall plate, having a local bus interface which is connected to a field bus interface, a data processing device and a memory for storing parameters obtained via an interface for setting parameters for the input/output modules.

2. The device of claim 1, wherein said communications module can connect to two individual plates.

3. The device of claim 1, wherein an initial plate which can be connected via said communications module with another individual plate has a field bus connection and at least one interface.

4. The device of claim 1, further comprising;

devices for pre-stabilizing supply voltage.

5. The device of claim 1, wherein said input/output modules and said communications module contain devices for detecting and reporting line breaks or short circuits.

6. The device of claim 1 wherein said input/output modules and the communications module have devices for galvanic signal separation.

7. The device of claim 1 wherein said input/output modules and the communications module have interface devices for service purposes.

8. The device of claim 1 wherein said input/output modules contain a microprocessor for data pre-processing.

9. A device for the inherently safe signal matching of signals being exchanged between an automating system and field devices, the device comprising:

a backwall plate having an initial plate and adjacent modular plates, the backwall plate supporting data lines of a local bus and current supply lines;

input/output modules connected to the backwall plate, each input/output module having a data processing device, a signal matching device, and a local bus interface for connection to the local bus; and a communications module connected to the backwall plate, the communications module having a local bus interface connected to a field bus interface, a processor, and a memory for storing parameters obtained via an interface for setting parameters for the input/output modules.

10. The device of claim 9 further including a connecting module for connecting the modular plates.

11. The device of claim 10 wherein the connecting module contains a device for pre-stabilizing a supply voltage for the modular plates.

12. The device of claim 9 wherein the memory of the communication module stores initialization parameters and the initialization parameters are transferred to the input/output modules upon the input/output modules making contact with the local bus.

13. A modular interconnect apparatus for communicating signals between an automating system and field devices, the apparatus comprising:

a backwall plate having an initial plate and at least one modular plate interconnected to the initial plate, the backwall plate defining a local bus having a data line and a current supply line;

at least one input/output module connected to the modular plate, the input/output module having a processor, a signal matching device, and a local bus interface for connection to the local bus; and a communications module connected to the backwall plate and interconnecting the initial plate with the modular plate, the communications module having a local bus interface electrically connected to a field bus interface, a processor, and a memory for storing parameters obtained via an interface for initializing the input/output modules.

14. The apparatus of claim 13 wherein the backwall plate includes adjacent modular plates interconnected to the initial plate.

15. The apparatus of claim 14 further including a connecting module connecting the adjacent modular plates.

16. The apparatus of claim 15 wherein the connecting module contains a device for pre-stabilizing a supply voltage for the modular plates.

17. The apparatus of claim 13 wherein the parameters stored in the memory are transferred to the input/output module upon the input/output module making contact with the local bus.

18. The apparatus of claim 13 wherein the initial plate includes a field bus connector.

19. The apparatus of claim 13 wherein the initial plate includes connectors for a standardized interface.

20. The apparatus of claim 19 wherein the standardized interface is an RS-485 interface.

* * * * *